United States Patent [19]

Murphy

[11] Patent Number: 5,000,812

[45] Date of Patent: Mar. 19, 1991

[54] PRINTER CUTTER LAMINATOR

[75] Inventor: William J. Murphy, South Acworth, N.H.

[73] Assignee: Imtec, Inc., Bellows Falls, Vt.

[21] Appl. No.: 386,214

[22] Filed: Jul. 28, 1989

[51] Int. Cl.[5] .......................... B32B 31/00; B26D 5/00

[52] U.S. Cl. .................................... 156/268; 156/353; 156/361; 156/384; 83/289; 83/324; 83/342

[58] Field of Search ................................ 156/353–355, 156/361, 268, 384; 83/324, 342, 286, 289

[56] References Cited

U.S. PATENT DOCUMENTS

| | | | |
|---|---|---|---|
| 3,552,251 | 1/1971 | Neff | 83/342 X |
| 3,859,879 | 1/1975 | Spengler | 83/342 X |
| 4,255,998 | 3/1981 | Radszibat | 83/324 X |
| 4,497,229 | 2/1985 | Carrington | 83/324 X |
| 4,507,994 | 4/1985 | Meurer | 83/324 X |
| 4,519,868 | 5/1985 | Hoffman | 156/353 |
| 4,680,083 | 7/1987 | Kashiwaba | 156/353 X |

*Primary Examiner*—David A. Simmons
*Assistant Examiner*—Chester T. Barry
*Attorney, Agent, or Firm*—Robert Shaw

[57] ABSTRACT

Cutter apparatus to cut accurately a composite label without cutting the backing of the composite and a system that includes the cutter apparatus. The cutter apparatus includes a transporter mechanism positioned to receive the composite, which typically includes the backing, many labels on the backing and laminate covering the surfaces of the labels, the transporter mechanism being precisely operable to move the composite translationally in a direction (i.e., the X-direction herein). A detector ascertains the precise location of individual labels on the composite and is interconnected to provide control signals to the transporter mechanism to enable that mechanism to move the composite precisely along the X-direction. A cutter and actuator assembly is interconnected with the transporter mechanism to effect a precise cut of the composite label respectively at the forward and rearward edges of the label while the transport mechanism is moving the composite and cutting is discontinued once the cut at each place is achieved. Then a new label is moved into place. The cutter apparatus can be freestanding or can be an integral part of a larger system that may include a printer, winder, slitter, and so forth.

37 Claims, 6 Drawing Sheets

PRINTER CUTTER LAMINATOR

BACKGROUND OF THE INVENTION

The present invention relates to printer cutter laminators and the like, as well as systems that embody such printer cutter laminators.

In many technical applications, printed documents such as labels and shipping tags are required to withstand environmental extremes while maintaining legibilty long after they have been printed. The nature of the information to be printed greatly determines the techniques that can be used both to print and to protect the label or tag. Where the information to be printed is known well in advance and is either constant or predictably different (sequential numbers, for example), batch printing techniques such as hot stamping can be used effectively and economically, if the quantities are high enough. If the information to be printed includes data that is not known until a short time before the label is needed, some other form of printer such as a label-on-demand, ink-type printer is usually a far better solution. Unfortunately most ink type printers, whether thermal or impact, do not produce labels that will withstand severe environments unless the printed surface has been protected with a laminating film of some kind. Electrostatic type printers fare somewhat better as regards the environmental stability of the printed output, but are considerably more complex and expensive. Even in the electrostatic case, the printed label requires some form of surface protection to avoid abrasion of the printed material.

Label stock is readily available on a continuous liner in either continuous roll form or die cut to size. Most laminating films are supplied as a continuous roll of adhesive backed stock. When laminating labels, the labels must first be printed, then laminated and finally cut to size. While it is possible to obtain die cut laminate sized to fit a die cut label, the problems of accurately laminating die cut laminate to a die cut label on the fly after printing greatly complicate the machinery and process. (See application Ser. No. 328,286 for "Optical Density Measurement Apparatus in the Context of Labeling and Other Devices", filed Mar. 24, 1989, Murphy.)

Thus it is the cutting step that poses the most difficulty in laminating labels A proper and effective solution to this problem incorporated in a stand-alone printer significantly enhances the utility of the printed label. Further, if the cutter will cut the laminate, it can also simultaneously cut the label stock and thereby eliminate the need for die cut stock. Die cut stock, although usually fairly readily available, does predetermine the label size and is more costly than its continuous counterpart.

Further, a properly designed cutter need only be operative when it is actually cutting the label stock to separate the end of one label from the beginning of the next. Implicit in this concept is the fact that the resultant label can be of any size down to some practical minimum as determined by the characteristics of the printing mechanism and associated cutter.

OBJECTS OF THE INVENTION

Accordingly, it an object of the present invention to provide a printing system that includes a low cost thermal or impact type printer capable of producing labels on a variety of stable surfaces (mylar, vinyl, etc.), that includes a mechanism for applying a continuous film of laminate over the printed surface, and that further provides a way to separate the printed and laminated labels thus produced by cutting the laminate and label while at the same time leaving the carrier backing to which the label stock is attached intact.

It is another object of this invention to provide a system that includes a mechanism for applying a continuous film of laminate over previously printed labels and that further provides a way of detecting the individual labels and separating them by cutting the label and laminate while leaving the backing intact.

There are devices, called butt cutters, previously known, for cutting composite laminated label stock into labels while leaving the backing intact. Devices such as the Cutting Device, U.S. Pat. No. 4,494,435 (Lindsay), are presently incorporated in printer laminators manufactured by IMTEC, INC., Bellows Falls, Vt. A similar device, referred as a "Cutter Device For A Film Strip On A Laminate", U.S. Pat. No. 4,680,083 (Kashiwaba), is manufactured by Kabushiki Kaisha Sato of Japan. In these devices, a fixed knife blade, longer than the stock is wide, is arranged parallel and adjacent to the surface of the composite label to be cut and perpendicular to the direction of travel of the label stock A movable roller, the axis of which is parallel to the cutting edge of the knife, is located on the back side of the label stock The roller is swung past the knife edge thereby pressing the composite laminate firmly against the blade. The spacing between the knife edge and the periphery of the roller is adjusted so that at its closest it is just sufficient to cut the laminated label yet leave the backing intact.

Butt cutters of this nature work well in stand alone label cutters, laminators or printer laminators, but require that the transport apparatus moving the label stock into position halt momentarily during the time that the cut is being made. The forces involved in making the cut are very high, being governed by strength of the label and laminate materials. These forces, although principally directed perpendicular to the face of the stock, have a significant component parallel to the direction of travel of the stock. This parallel component results in a considerable tug on the stock itself which, if moving, causes a change in velocity of the stock as well as partial separation of the stock from the backing at the point where the cut was made.

Despite considerable effort spent attempting to make butt cutters of this nature work with moving stock, to date efforts have proven unsuccessful. The present solution for devices employing butt cutters of this nature is to have a mechanism for ascertaining the exact label position relative to the mechanism and a controllable structure for transporting the composite label stock within the mechanism. The label stock is advanced by the transport structure one label length as determined by a sensor and then stopped. The cutter is then actuated to effect the cut. The transport means then advances the stock another label length and the cycle is repeated. The position of the cutter or the sensor is adjusted in the direction of the label stock in order to bring the location of the cut into proper position with respect to the printed label.

In a purely mechanical or combinationally controlled system, the relative location of the sensor from the cutter must be adjusted to be an integral number of label lengths plus an offset. As differences are encountered, the machine must be readjusted to maintain cut registration. In a programmably controlled machine, the relative location of the sensor with respect to the cutter can be fixed. This value is stored in the controller memory and used in conjunction with the sensor signals and the transport structure to establish the location of the spot between labels within the mechanism. As each such boundary is brought into position with respect to the cutter, the transport structure is halted and a cutter cycle is initiated. This eliminates the need for the mechanical adjustment and permits one machine to operate with different label sizes. Laminating and cutting devices of this nature using programmable controllers have been developed by IMTEC, INC., Bellows Falls, Vt.

When these concepts and apparatus are applied to a machine that incorporates a printer as well as a laminator, not only must the label transport mechanism be halted but the printing mechanism as well. If the print point is located an integral number of label lengths from the cut point, then the halting takes place at the same time and in the same place that the printer is not normally printing, it being implicit that there is a margin area between labels left unprinted. Under these conditions, the cut operation is identical to that for the laminator alone. Such a machine must still be adjusted to the specific label length being printed.

In a machine where the cutter-to-print point distance is fixed, it is likely that the gap between labels will be positioned at the cutter while the printer is in the midst of printing a label. At this point, if the cutter is operated and there is any relative motion of the label stock with respect to the print point, print quality will be impaired. This condition is especially severe if the stock is moving and the label is being printed at the time that the cut is made. The severity of the problem mandates that the printer and transport mechanism be stopped completely when the cut is made.

With some printing technologies, e.g., impact hammer and rotary drum, it is straightforward to suspend printing momentarily at any point without affecting print quality. Machines that incorporate an impact hammer/rotary drum printer with a laminator and fixed blade butt cutter operating with a programmable controller as described above are manufactured by IMTEC, INC., Bellows Falls, Vt.

Other print technologies such as electrostatic or thermal transfer are subject to considerable print quality problems if the printing process is interrupted in the middle of printing a label. Hence the solution of stopping the motion of the label stock and the printer during the time that a cut is being made introduces the same problem that it is attempting to solve.

An object, then, of the cutting device herein disclosed is to provide a cutter that will operate in such a way that the label stock can be in motion at the time that the cut is being made without causing significant motion variation of the stock being cut, significant here being defined to mean of sufficient magnitude as to cause a deleterious effect.

It is a further object of this invention to provide a cutting device that will operate in conjunction with a printer that incorporates any common printing technology such as thermal transfer or impact/drum, such operation being sufficiently stable so as not to affect the print quality.

It is a still further object to provide a cutting device that will operate over a wide range of label lengths without requiring readjustment.

Yet another object is to provide a cutting device that will provide high reliability and long service life and be reasonably inexpensive to manufacture.

These and still further objects are addressed herein.

SUMMARY OF THE INVENTION

The foregoing objects are attained, generally in a cutter operable to cut a label, on a composite that includes backing and a plurality of labels, without cutting the backing, that includes: a transporter mechanism positioned to receive the composite and precisely operable to move the composite translationally in a direction; a detector suitable to ascertain the exact location of individual labels on the composite and interconnected to provide signals to the transporter mechanism to enable the transporter mechanism to move the composite precisely along the direction; and a cutter and actuator assembly that includes a cutter capable of cutting in one or two axes, the cutter and actuator assembly being interconnected with the transporter mechanism to effect accurate cuts of labels while the transporter mechanism is moving the composite, such cuts including precision curvilinear cuts of the label edges, the cutter and actuator assembly being further operable to make cuts parallel to the said direction of variable length, the cutter and actuator assembly being further operable to terminate cutting, once the cut is effected, until the next label forward edge is brought into place by the transporter mechanism. The invention also contemplates a system that includes the cutter apparatus.

The invention is hereinafter described with reference to the accompanying drawing in which.

DETAILED DESCRIPTION OF THE INVENTION

Figure 1:
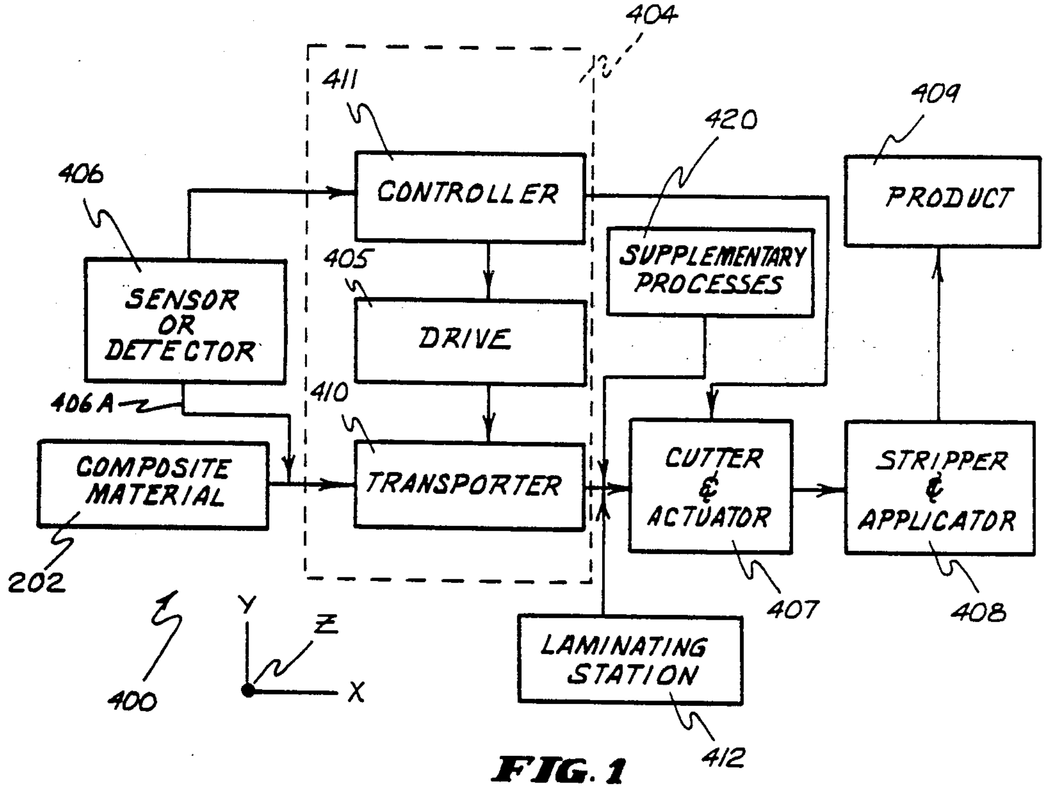
FIG. 1 is a block diagram showing both label flow and information flow within a system to convert label stock into individual labels, the system typically, but not necessarily, including printing capability and laminate application capability.
Figure 2:
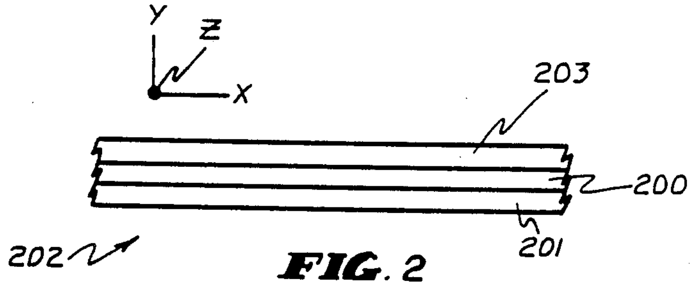
FIG. 2 is a longitudinal view of a very short piece of composite stock showing a backing that moves to the right in the figure carrying a label and a laminate on the label in the system of FIG. 1.

Turning now to the drawing, there is shown at 400 in FIG. 1 a printer cutter laminator to print a label 200 in FIG. 2 on a backing 201, laminate the label 200 with a laminate 203 to form a composite 202 and cut the label 200 with the laminate 203 thereon to a precise size, i.e., a precise longitudinal length (X-direction), wherein the length direction (plus/minus) is in the direction of travel of the composite 202. (See composite 222 in FIG. 3.) The printer cutter laminator 400 includes a transporter mechanism 404 to receive the composite 202 and operable to move the composite 202 translationally in the X-direction; the apparatus 400 further includes a transporter drive 405 (in the mechanism 404) connected to move (or propel) the composite 202 in the transporter mechanism 404 along the X-direction; the transporter drive 405 controls the position of or responds to position information with respect to the position of the composite along the X-direction to drive the composite by a transporter 410 in the plus X-direction. A sensor or detector 406 senses X-direction position information with respect to the composite 202; the sensor or detector 406 is interconnected to provide signals to the transporter mechanism 404 to enable or cause the transporter 410 (through the transporter drive 405) to move the composite 202 a known distance along the X-direction, the known distance being one label length (in the X-direction). A cutter and actuator 407 is energized to effect a cut of the label 200 and the laminate 203, but not the backing 201. The system 400 may include a stripper and applicator 408 which applies a label 200 and laminate 203 onto a product 409.

A very important aspect of the present invention is the cutter and actuator 407, as now explained. The cutter apparatus, as explained herein, typically must cut the laminate 203 and the label 200 without cutting the backing 201 (e.g., see FIG. 6). The transporter mechanism 404 is positioned, in the printer cutter laminator 400, to receive the composite 202 and is precisely operable to move the composite 202 translationally in the plus X-direction in FIG. 1. The sensor or detector 406 is suitable (i.e., effective) to ascertain the precise X-direction location of individual labels 200 in the composite 202 and is interconnected to provide signals to the transporter mechanism 404 to enable the transporter mechanism 404 to move the composite 202 precisely (i.e., known distances) along the X-direction.

Figure 3:
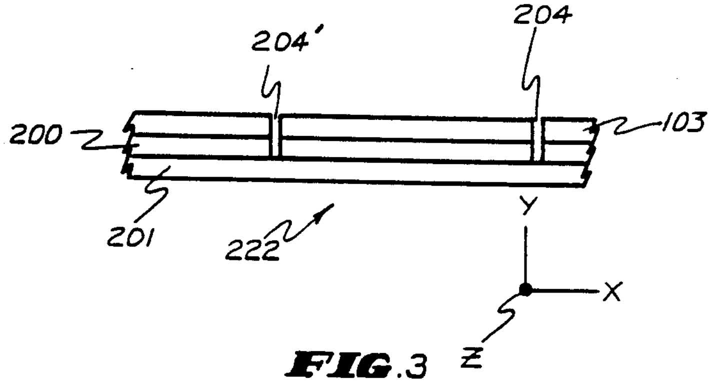
FIG. 3 is a view like that in FIG. 2 to show a composite that has been cut to provide a label with laminate thereon.

The cutter and actuator assembly 407 is interconnected with the transporter mechanism 404 to effect a precise cut of the composite label 202 at the label forward edge 204 in FIG. 3. According to the present teaching, cutting is discontinued, once the cutting of the label and laminate is achieved, until the forward edge 204' of the next label 200 has been brought into place by the transporter mechanism 404. The forward edge 204' of the next label in sequence is in fact the rearward edge of the present (or next previous) label. Precise electrical devices and circuitry to achieve the foregoing functions are discussed herein, but here the overall operation of the cutter apparatus is explained.

Figure 5:
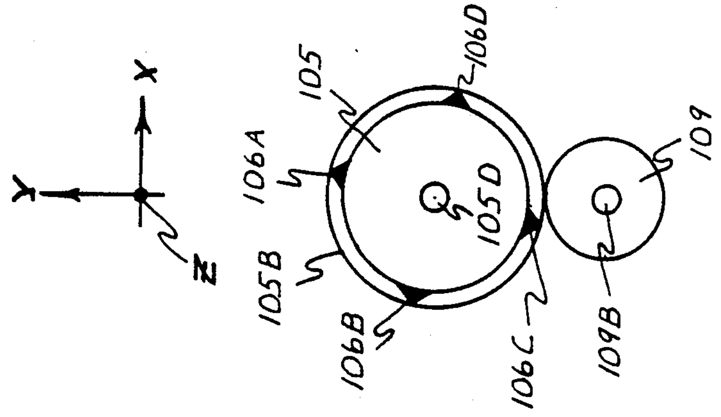
FIG. 5 is a view (without section lines and simplified for clarity) taken on the line 5—5 in FIG. 4 looking in the direction of the arrows.

In accordance with the present teaching the cutter is in the form of a cylinder or roller 105 (FIGS. 4 and 5) with at least one elongate blade 106C (106A . . . 106C in FIG. 5, any one of which may be referred to as 106 herein) at the cylinder periphery oriented generally axially with respect to the cylinder 105. The cylinder axis is marked 105D and, as noted hereinafter, it is disposed at a slight angle from a true perpendicular to the X-direction for purposes to be explained. In this art the cylindrical cutter 105 is cut out of a solid cylindrical piece and the blade(s) 106A. . . are cut out of the same piece. Typically a plurality (four herein) of axially extending blades 106A . . . 106D are cut or otherwise formed at the periphery of the cylinder 105. These blades are oriented to have a major axial component (i.e., Z-direction) parallel to the axis of the cylinder 105.

Figure 11:
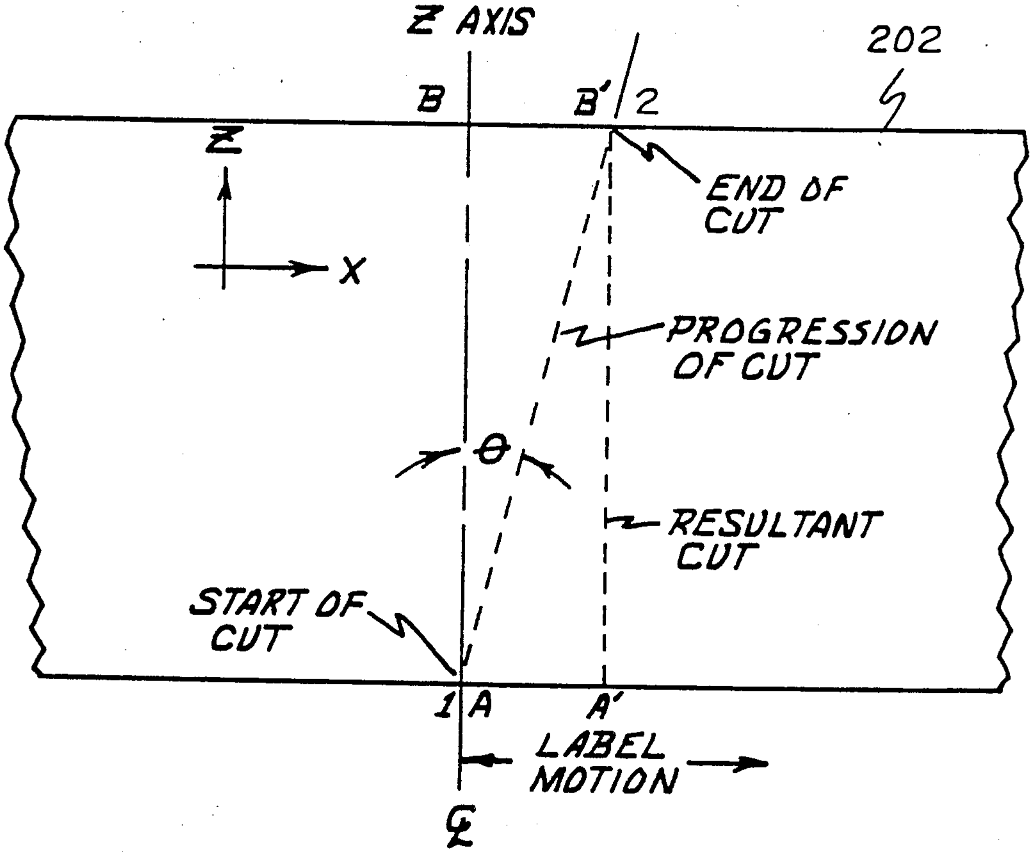
FIG. 11 is a diagram depicting the generation of a true perpendicular cut from a helically skewed cutter.

A most important aspect of the present teaching is, however, that the elongate blade(s) 106A. . . be skewed a predetermined amount, that is, the elongate blade(s) 106A. . . describe a generally axially-oriented helical path of predetermined small helical angle to the Z-direction in FIG. 11. That small helical angle is usually between about one and four degrees per inch of axial cylindrical displacement and preferably—or ideally—is about one and one-half degrees per inch of axial cylindrical displacement.

Furthermore, and most importantly, the cylinder axis 105D is disposed at a slight angle (shown greatly exaggerated in FIG. 11) to a line perpendicular to the X-direction—i.e., to the Z-direction. The slight angle $\theta$ is equal to and opposite to the predetermined small helical angle in order that the resultant cut (i.e., the Z-direction cut) across the composite material 202 be perpendicular to the X-direction.

The printer cutter laminator 400 in FIG. 1 includes the foregoing structures, but further may include a printer to apply indicia onto each label. As taught herein, the printer may constitute the detector 406, but it may be a separate unit in the structure 400. Before getting into precise structures, a few matters, general in nature, are discussed.

Figure 4:
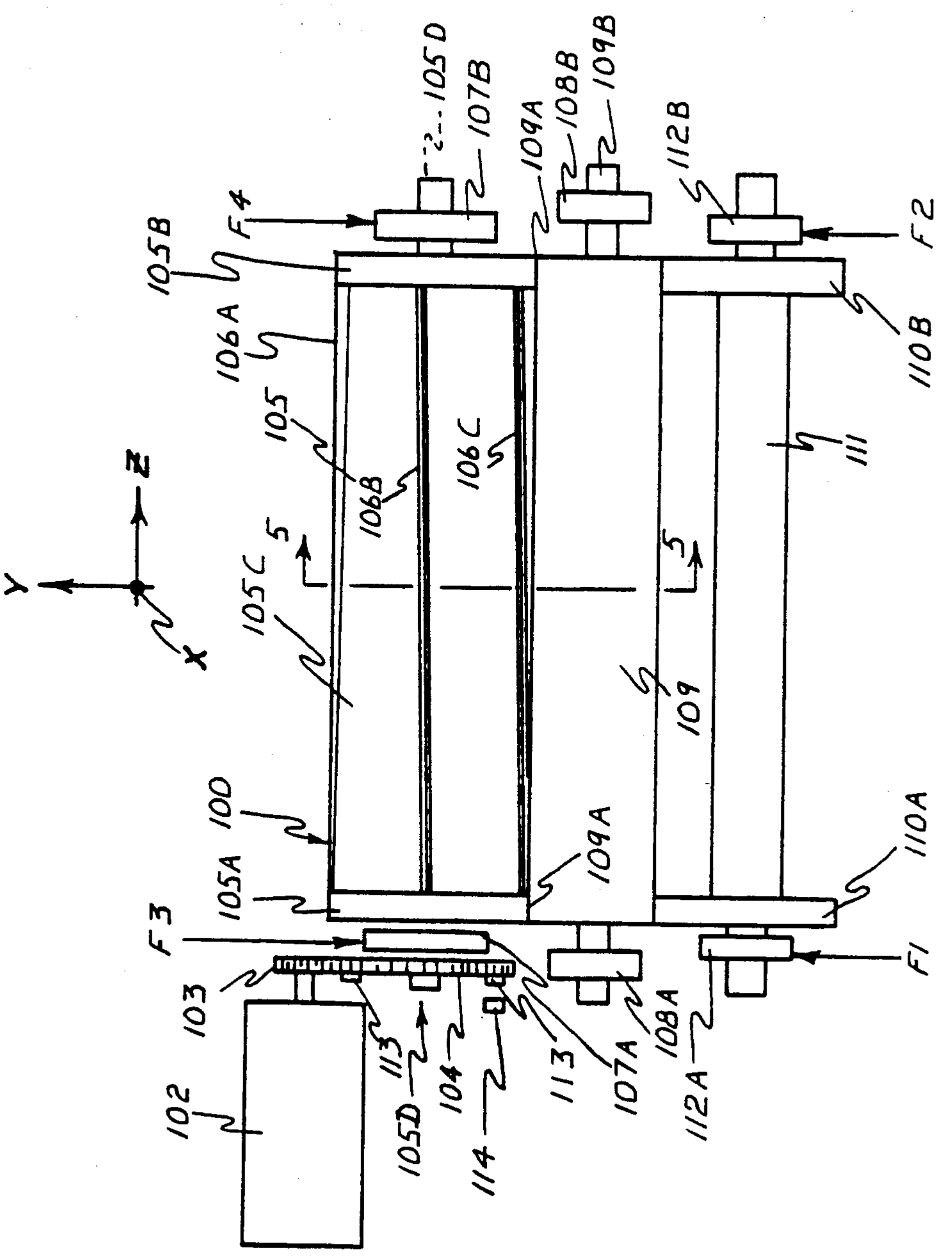
FIG. 4 shows a mostly diagrammatic end view of cutter apparatus according to the present invention, to receive composite stock and operable to cut that stock in a predetermined fashion, and showing a cylinder with longitudinal cutter blade(s) at the periphery thereof.

The actuator in the cutter and actuator 407 of FIG. 1 may be a positionally incremented rotary motor 102 in FIG. 4 interconnected with the transporter mechanism 404 and operable to rotate the cutter cylinder 105 of the cutter generally marked 100. The motor 102 rotates the cylindrical cutter 105 in positioned synchronism with the composite label 202 while the elongate blade 106D, for example, is effecting a cut of the composite 202. The motor 102, and its controller, is further operable to rotate the cylinder 105, after a cut has been effected, at an accelerated slew rate to a predetermined home position prepatory to the next cut, the home position being at a place where the next blade 106B, for example, on the cylinder is immediately adjacent to the upper surface of the composite 202 which is to be cut or severed by the blade 106B.

The actuator 102 may be a stepper motor and controller, a servomotor and controller with a shaft angle feedback, operable responsive to signals from a further controller 411 in the transporter mechanism 404 in FIG. 1 to rotate the cutter cylinder 105 in synchronism with the composite label 202 or at the accelerated slew rate, as the case may be.

Typically the cutter 100 includes a plurality (i.e., usually four) of elongate blades 106A . . . circumferentially spaced around the circumference of the cylinder 105 and disposed generally helically, axially along the cylinder 105, the home position being the start position of the next blade 106 in succession. The sequence then is: (1) positioning the next successive blade 106 in the home position; (2) cutting the laminate and label; (3) rotating the cutter cylinder at an accelerated or slew rate to the home position; and repeating.

The machine 400 in FIG. 1 includes the cutter and actuator assembly 407, but typically, as noted above, includes a printer to apply indicia onto each label and the printer may constitute the detector 406. Typically, also, it includes a laminating station 412 in FIG. 1 interposed between the printer and the cutter and actuator assembly 407.

The sensor or detector 406 may be an optical detector responsive to gaps between individual labels of precut stock disposed on the backing 201, in which case the line marked 406A would typically designate optical signals. On the other hand the detector may be responsive to preprinted information or sense marks on the composite 202, that serve to demarcate discrete labels, a known technology. Further, the detector may be a positionally controllable motor that can be caused to advance the label stock a known distance while at the same time printing indicia on the stock.

The various structures described and characterized above typically are part of a system that includes mechanisms 420 to perform winding and/or slitting and/or flood coating and/or preprinting, and so forth. The output, then, is a label and, usually, laminate that is applied onto a product 409.

The positionally controllable motor 102, e.g., a stepping motor, is arranged to drive the shaft of a cutter roller or cylinder 105 through timing belt pulleys or gears 103, 104 in FIG. 4. The end bearers 105A, 105B of the cutter roller 105 are machined to a fixed diameter. These bearers bear directly on the outer diameter labeled 109A of a master roller 109. The master roller 109 bears tangentially on the outer diameter of bearings 110A, 110B. The inner races of the bearings 110A and 110B are supported by the shaft of a tertiary roller 111. The roller 111 is, in turn, supported by bearings 112A, 112B. A preload force F1, F2 is applied to the bearings 112A, 112B and is transmitted through the support structure just described to produce a resultant force F3, F4 shown in FIG. 4. The shaft labeled 109B of the master roller 109 rotates within bearings 108A and 108B.

FIG. 2, as above noted, is an elevation view of a composite material 202. The composite material 202 consists of a backing material 201, a second material 200, usually an imprintable label material, and an overlaying laminate 203.

Figure 6:
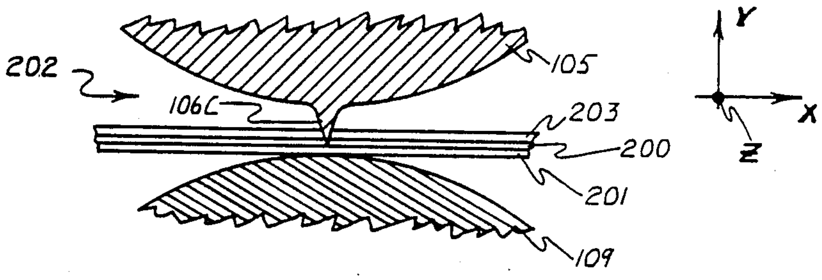
FIG. 6 is an enlarged portional view, like FIG. 4, showing the cylinder of FIG. 4 with a blade protruding from the cylinder periphery and into the composite.

FIG. 6 is a partial cross sectional view (greatly enlarged) of the cutter roller 105. Referring to FIGS. 4 and 6, the cutter roller 105 is machined everywhere along its surface between the end bearers 105A, 105B except in the area shown in the figures as 106A, B, C, D, which area 106A, B, C, D, is machined in the shape of a knife edge. The point of the knife edge is radially located below the radius of the bearers 105A, 105B by a distance equal to the thickness of the backing 201 in FIG. 6. FIG. 6 also shows the composite label material 202 of FIG. 2 passing between the two rollers 105 and 109. As the cutter 105 rotates in synchronism with the moving stock 202, the cutter knife 106 exerts considerable force on the laminate 203 and label stock 200. The force is resisted by the master roller 109 and its associated support structure. When the forces exceed the shear strengths of the materials 203 and 200, the materials are severed. The backing 201 remains intact.

Figure 7:
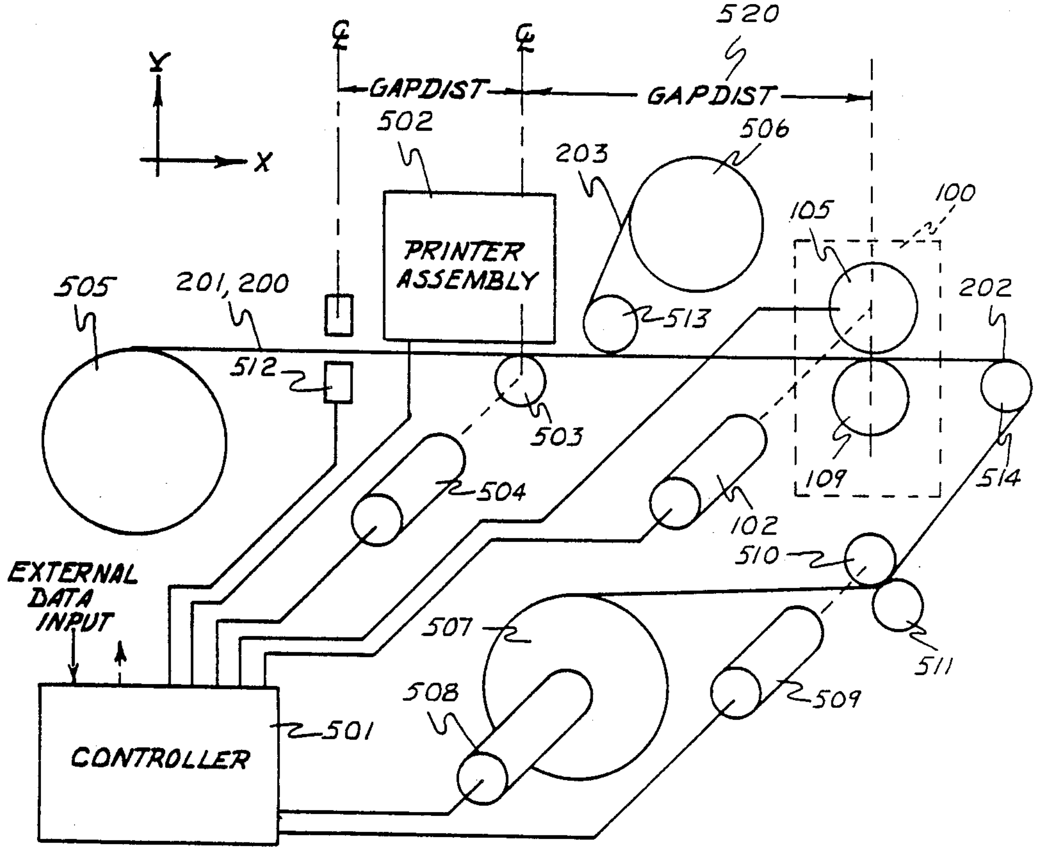
FIG. 7 is a block diagram of a typical printer laminator cutter employing the concepts of the present invention.

FIG. 7 is a block diagram of a controller, etc., to control the motion of the composite material 202 as well as the operation of the rotary die cutter 100. The printer-laminator-cutter in FIG. 7 consists of a printer assembly 502, a laminate supply system 506, the cutter assembly 100 of FIG. 4, a label supply system 505, a label takeup system 507 and a controller 501. A composite label material consisting of a continuous backing material 201 and an adhesive backed label material 200 is supplied from the supply system 505 and is threaded through the printhead 502 to the laminating roller 513. The laminating roller 513 applies a film of laminate 203 to the composite label material 201, 200 to form the further composite label material 202 of FIG. 2. This material 202 is fed through the cutter assembly 100 past the turn-around system 514 and eventually onto the takeup roll of 507

A sensor 512 senses the density of stock between the elements of the sensor assembly 512. A further sensor 114 in FIG. 4 senses the rest or home position of the cutter roller 105 (see flags 113) . The outputs of these sensors are connected as inputs to the controller 501. The controller 501 also connects to and drives the capstan motor 504, the cutter motor 102, the takeup motor 508 and the optional second takeup motor 509. The controller 501 receives as input external data and instructions that relate to the format and content of information to be printed. This information may come from a variety of sources such as communication lines, a computer, etc., as is well known and will not be discussed further.

The controller 501 processes the data and instructions in accordance with a defined set of rules and causes the print mechanism 502 to print the data on the label stock 200 as the controller advances the label stock by means of the motor 504. The print mechanism 502 may be any print mechanism suitable for printing the label material, but is typically a thermal transfer type of printer. A thermal transfer type of printer will be assumed in the balance of this discussion, but such use shall not be deemed to be restrictive.

Figure 8A:
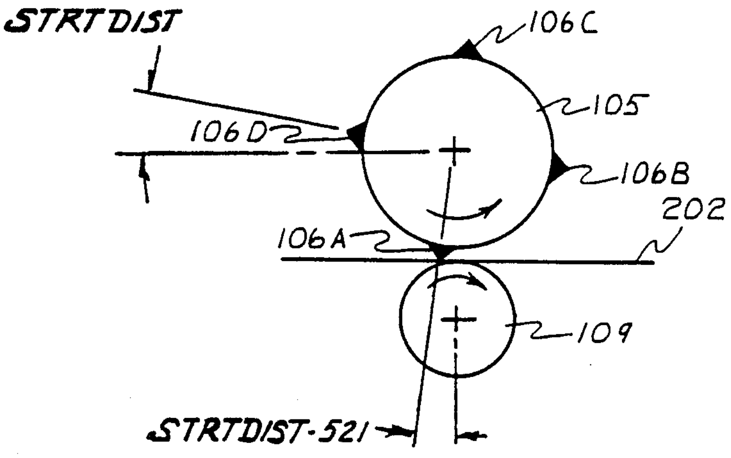
FIGS. 8A-8D (collectively FIG. 8 herein) are diagrams showing the different positions of the cutter during a cut sequence.
Figure 8B:
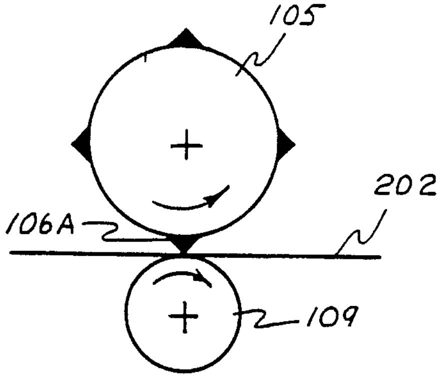

The controller 501 has stored in it the distance from the print point to the cut point labeled CUTDIST (520) in the FIG. 7. The cutter is caused to be in a rest position as shown in FIG. 8A whereby the cutter blade 106A is positioned to be close to but free of the surface of the composite label stock 202. A distance labeled STRTDIST (521) is defined to be the linear distance that the cutter blade 106A must travel from the rest position in order to bring the knife edge to its deepest penetration into the label material 202. This point is the position of the knife as shown in FIG. 8B. The controller determines the leading edge of a label by means of the sensor 512 of FIG. 7 for previously demarcated label stock (die cut, etc.) or by knowledge of the position of the label stock as controlled by the motor 504 and capstan 503 of FIG. 7. When the controller has advanced the leading edge of the first label, by means of the motor 504 and capstan 503, a distance equal to CUTDIST—STRTDIST, the controller then causes the cutter roller 105 to rotate synchronously with the label stock, advancing the knife 106 the same incremental distance as the label stock by controlling the cutter drive motor 102. It is important that the cutter blade 106 move in synchronism with the label stock. If it does not do so, then the imbedded blade 106 will impart motion to the label stock which, for most printers, will impair print quality. It should be recognized that the velocity of the label stock is in general not constant but varies considerably depending upon the nature of the print mechanism and the data being printed. Many print mechanisms move the stock in small increments between transferring characters and halt the stock while an actual character transfer or portion thereof is being made. With the cutter control scheme described above, the cutter keeps pace with the label stock regardless of its speed, and hence the cut point registration is always maintained.

Figure 8C:
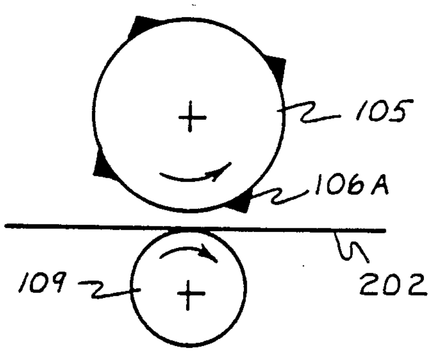
Figure 8D:
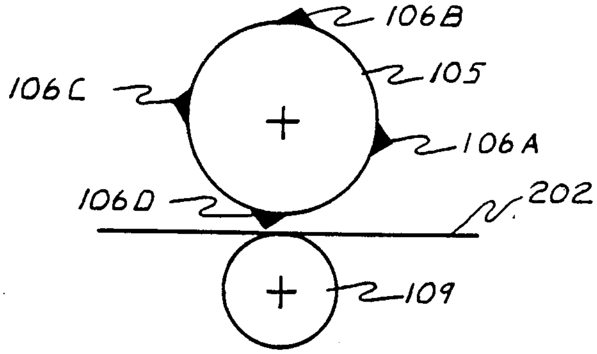

This synchronous method of operation is continued until the cutter roller 105 has rotated sufficiently far that the cutter blade 106 comes clear of the composite label stock. At this point the label stock can pass freely under the cutter roller 105. Motion of the cutter roller 105 will have no effect on the label stock motion. When this condition is reached, the controller 501 causes the cutter roller 105 as shown in FIG. 8C to rotate at its maximum velocity until the cutter position sensor 114 of FIG. 4 signals that the next cutter blade has reached the start position as shown in FIG. 8D. At this point, the controller 501 stops the cutter motor 102 until the next label in queue reaches the start position, whereupon the cycle will be repeated.

FIG. 8 depicts this sequence of events. A cutter roller 105 configured with four blades is shown for the example, but this depiction is not restrictive. The minimum angular spacing between blades is limited only by the number of degrees of rotation required to start out with the blade clear of the stock and to wind up with that same blade clear of the stock downstream and the succeeding blade still clear upstream. FIG. 8A shows the starting position, FIG. 8B the position with the knife fully imbedded in the stock, FIG. 8C the position with the knife just coming free of the stock and FIG. 8D the position with the cutter fully rotated to the next blade in succession.

Figure 9:
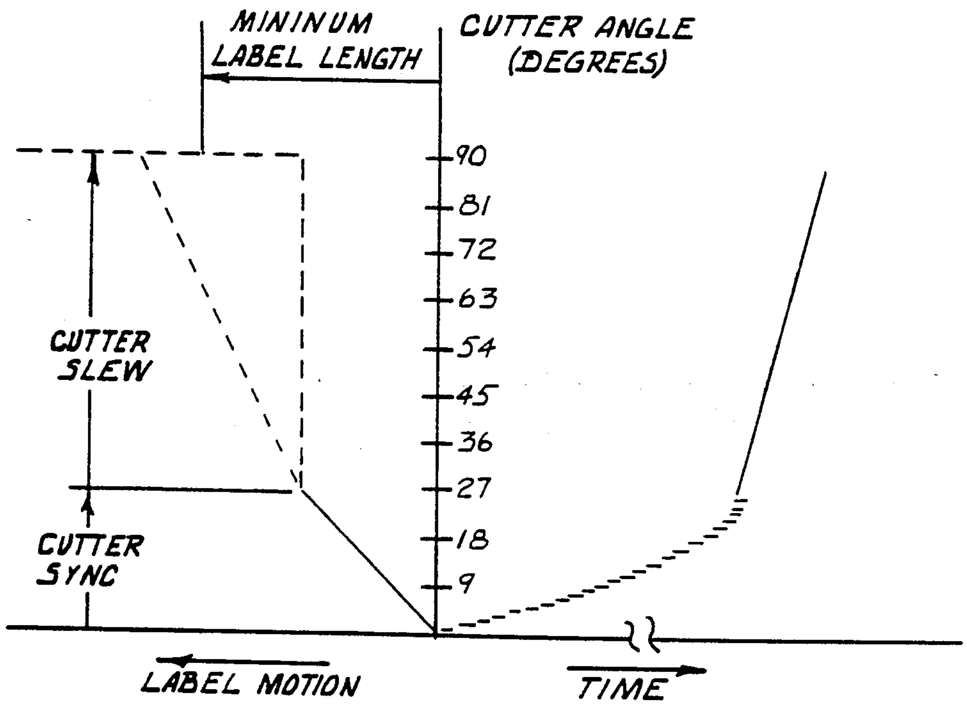
FIG. 9 is a graph showing the position of the cutter as a function of label position and time.

FIG. 9 shows the position of the cutter roller 105 as a function of both time and label stock 202 . There is no particular time scale during the synchronous portion of the cut cycle, the time being a function of the printer label velocity. The left half of the figure shows the correspondence of cutter 105 angular position versus label stock (202) motion. It should be noted that with this control scheme the printer could be paused during the middle of the cut cycle for any arbitrarily long time period and the cutter would remain locked in step with the label stock. Once the printer resumes advancing the label stock, the cutter would complete the remainder of its cut cycle.

The right half of FIG. 9 shows the slew portion of the cycle in which the cutter is advanced rapidly to the new home position. Since the printer 502 can continue printing while the cutter roller 105 is slewing to its new home position, the slew portion of the cycle is made as short as possible in order to minimize the amount of label stock that passes through the cutter 100 while the cutter roller 105 is slewing home. The minimum length label that can be cut with this cutter arrangement is equal to the label distance required for the synchronous portion of the cycle plus the distance that the label can advance during the slew portion. It should be noted that the maximum length label is not limited by the cutter 105.

If the cutter 100 as described above is arranged with the cutter blade 106 parallel to the Z-axis of the cutter roller 105, then in order to make a cut that is perpendicular to the X-direction of travel of the label stock, the axis 105D of the cutter roller 105 must also be placed perpendicular to the direction of travel of the label stock. Under these conditions, the knife edge is fully engaged in cutting across the full width of the stock at the same point in time. The cumulative force required to shear the stock is equal to the shear strength of the material(s) times the area in shear which under these conditions is equal to the thickness of the stock times the width of the stock. This force is a function of the angular rotation of the cutter 105 and varies as the cutter blade 106 penetrates through the stock. In general, this force has a high peak value for about two degrees of rotation of the cutter roller 105 just after the cutter blade 106 contacts the stock. For wide stocks (five inches or so) made of strong plastic materials, e.g., a polyester or polyimide, this force can become considerable, being of the order of a thousand pounds or more. Forces of this magnitude require a very strong bearing structure and cutter rollers of high section modulus to prevent bending. The high bearing forces cause a large frictional torque to be developed in addition to the torque required for cutting per se. The torque requirement then dictates a powerful motor to assure cutting. The sum of all these factors thus requires a large and relatively expensive cutter assembly.

In commercial label production machinery, the size and costs of cutter structures of this nature are reasonable and consistent with the application In a stand-alone printer, a cutter assembly that is substantially more expensive than the printer alone is not warranted.

One of the ways to reduce the cutting forces required is to make the cutter blade in the form of a helix instead of a straight line along the length of the cutter roll. If, for example, a helical knife edge with a radial displacement of approximately 1.8 degrees per inch of travel along the axis of the cutter roller were to be made, then it would take 5*1.8 or 9 degrees of rotation of the cutter roller 105 to cut across the full width of a roll of five inch wide stock. Since the peak force is spread across an additional nine degrees, the magnitude of the peak force is reduced to about 25% of the peak value that would otherwise occur with a parallel knife. This reduction in peak value means that a much lighter and less expensive cutter assembly can be used with a helical blade to accomplish the same result as with the parallel cutter.

Figure 10:
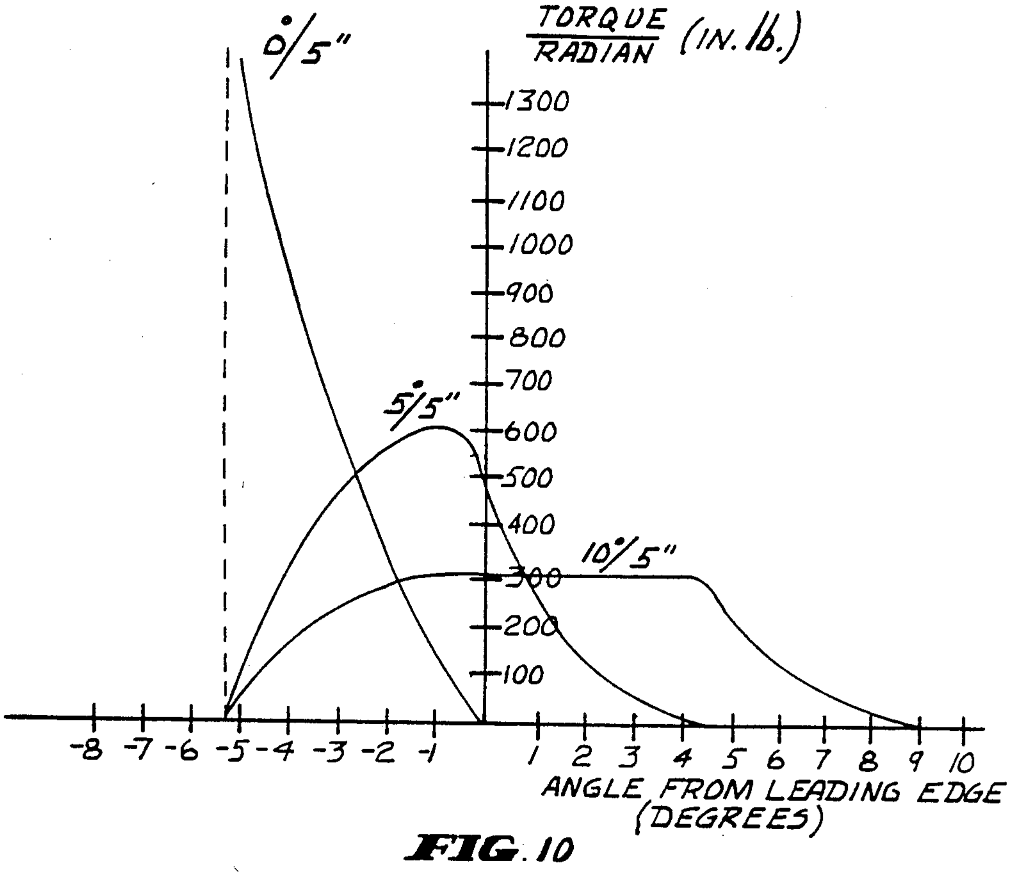
FIG. 10 is a graph showing the characteristic torque required to cut a label as a function of angular position of the cutter for three different helical angles.

FIG. 10 shows the torque required for three different helical angles to cut a five inch-wide label as a function of cutter roller 105. The drawback to the scheme is that if the axis 105D of the cutter roller 105 is located perpendicular to the direction of travel of the stock then the cut edge will have an angular offset or skew equal to the helix angle. With a five inch blade width, this would result in a trapezoidally shaped label with the leading and trailing edges skewed from true perpendicular by approximately 0.15 inches. The solution to this problem is to mount the cutter assembly in such a way that the axis of the cutter roller is shifted from a true perpendicular to the label direction (i.e., the X-direction) by the same amount as the helix angle, but in the opposite direction.

This angular shift rotates the point at which the master roller 109 is tangential to the label stock as shown in FIG. 11. This tangential point is the point at which cutting takes place when the knife blade 106 rotates past the master roller 109 and is shown in FIG. 11 as the line 1–2. Point 1 is coincident with point A. The line A-B in FIG. 11 represents a line perpendicular to the label stock, that is, parallel to the Z-axis and starting at point A in the figure. Point A is the point at which the cutter 106 first starts to cut the stock as the cutter roller 105 is rotated past the master roller 109 The distance A–A' in FIG. 11 represents the distance that the label stock will travel when the cutter is rotated synchronously with the label stock an amount just sufficient to bring the trailing edge of the cutter knife 106 into positional alignment with the master roller 109. The helix angle is chosen such that, if the start of the knife blade 106 were to be in contact with the stock 202 and the master roller 109 at the point labeled 1 in FIG. 11, the end of the knife blade 106 will be in contact with the label stock 202 and the master roller 109 at the point labeled B′ in the figure and in addition the line A′-B′ will also be perpendicular to the direction of travel of the label stock. The cut starts at the point A and advances to the point B′ as the cutter roller 105 rotates. The label stock starts at the point A and advances to the point A′. During the time that the point A advances to A′, the point B advances to B′. In other words, the cut starts at point A of the cutter roller 105 and advances to point B′ of the cutter roller while the stock advances from the line AB to the line A′B′. Since the line A′B′ is parallel to AB and AB is parallel to the Z-axis, it follows that the actual cut in the stock is perpendicular to the label stock.

Another way of visualizing the action that takes place is that the cut point progresses across the width of the stock (i.e., the Z-direction) while at the same time advancing downstream (i.e., the X-direction) a distance equal to the distance that the stock travels, thereby maintaining the cut line perpendicular to the label edge.

Further modifications of the invention will occur to persons skilled in the art and all such modifications are deemed to be within the scope of the invention as defined by the appended claims.

What is claimed is:

1. Cutter apparatus to cut accurately a composite label, without cutting the backing of the composite, that comprises:

a transporter mechanism positioned to receive said composite and precisely operable to move the composite translationally in a direction at a selectively variable velocity;

detection means suitable to ascertain the precise location of individual labels on the composite and interconnected to provide signals to the transporter mechanism to enable the transporter mechanism to move the composite precisely along said direction; and a cutter and actuator assembly, said cutter and actuator assembly including an elongated blade skewed a predetermined amount to describe a generally axially-oriented helical blade being interconnected with the transporter mechanism and responsive to said composite selectively variable velocity to effect a precise positionally synchronous cut of the composite label along the label forward and rearward edges while the transporter mechanism is moving the composite and further being operable to discontinue cutting once the cut is effected and thereafter reposition said cutter independently of the label position and velocity until the next label forward edge has been brought into place by the transporter mechanism.

2. Cutter apparatus according to claim 1 in which said axially oriented helical blade includes a small helical angle between about one and four degrees per inch of axial displacement.

3. Cutter apparatus according to claim 2 in which the helical angle is about one and one-half degrees per inch of axial cylinder displacement.

4. Cutter apparatus according to claim 5 in which the cutter axis is disposed at a slight angle to a line perpendicular to said direction.

5. Cutter apparatus according to claim 4 in which the slight angle is equal to and opposite to the predetermined small helical angle in order to effect a cut across the composite label that is perpendicular to the said direction.

6. Cutter apparatus according to claim 5 having a plurality of elongate blades, spaced around the circumference of the cylinder and disposed in the manner of said elongate blade.

7. A machine that includes the cutter apparatus of claim 1 that further includes a printer to apply indicia onto each label.

8. Cutter apparatus according to claim 1 in which the actuator is a positionally incremented rotary motor interconnected with the transporter mechanism and operable to rotate the cylinder of the cutter.

9. Cutter apparatus according to claim 8 in which the actuator rotates the cutter in positioned synchronism with the composite label while the elongate blade is effecting the cut of the composite label and which is further operable to rotate the cylinder, after a cut has been effected, at an accelerated slew rate to a predetermined home position preparatory to the next cut.

10. Cutter apparatus according to claim 9 in which the actuator of the cutter and actuator assembly is one of a stepper motor and controller and a servomotor and controller with shaft angle feedback, operable responsive to signal from a further controller in the transporter mechanism to rotate the cylinder in synchronism with the composite label or at said accelerated slew rate.

11. Cutter apparatus according to claim 9 in which the cutter comprises a plurality of elongate blades spaced around the circumference of the cylinder and disposed in the manner of said elongate blade and in which the home position is the start position of the next blade in succession.

12. A machine that includes the cutter apparatus of claim 11 and that further includes a printer to apply indicia onto each label, said printer constituting the detection means.

13. A machine according to claim 12 that further includes a laminating station interposed between the printer and the cutter and actuator assembly.

14. A machine that includes the cutter apparatus of claim 11 and wherein the detection means is an optical detector responsive to preprinted information or sense marks that serve to demarcate discrete labels.

15. A machine according to claim 14 that includes a lamination station disposed between the detector and the cutter and actuator assembly.

16. A machine that includes the cutter apparatus of claim 11 and wherein the detection means is an optical detector responsive to gaps between individual labels of precut stock disposed on said backing.

17. A machine according to claim 16 that further includes a laminating station to apply protective laminate upon each said label, said laminating station being disposed between the detector and the cutter and actuator assembly.

18. A system that includes the cutter apparatus of claim 9 and that further includes mechanisms to perform at least one of winding, slitting, flood coating and preprinting.

19. Printer cutter apparatus to print and to cut accurately a composite that includes labels of a wide range of label lengths on a backing without requiring readjustment, without cutting the backing of the composite, that comprises:

a transporter mechanism positioned to receive said composite and precisely operable to move the composite translationally in a direction at a selectively variable velocity;

detection means suitable to ascertain the precise location of individual labels on the composite and interconnected to provide signals to the transporter mechanism to enable the transporter mechanism to move the composite precisely along said direction; and a printer positioned to apply indicia onto each said label;

a cutter and actuator assembly, said cutter and actuator assembly including an elongated blade skewed a predetermined amount to describe a generally axially-oriented helical blade being interconnected with the transporter mechanism and responsive to said composite velocity to effect a precise cut of the composite label along the label forward and rearward edges while the transporter mechanism is moving the composite and further being operable to discontinue cutting once the cut is effected and thereafter reposition said cutter independently of the label position and velocity until the next label forward edge has been brought into place by said transporter mechanism the cutter and actuator assembly being operable, in combination with said transporter mechanism, to provide said precise cut in positioned synchronism with the composite despite variations in the velocity of the composite and despite said range of label length and during the application of the label.

20. Cutter apparatus according to claim 19 in which said axially oriented helical blade includes a small helical angle between about one and four degrees per inch of axial displacement.

21. Apparatus according to claim 20 in which the helical angle is about one and one-half degrees per inch of axial cylinder displacement.

22. Apparatus according to claim 19 in which the cutter axis is disposed at a slight angle to a line perpendicular to said direction.

23. Apparatus according to claim 22 in which the slight angle is equal to and opposite to the predetermined small helical angle in order to effect a cut across the composite label that is perpendicular to the said direction.

24. Apparatus according to claim 19 in which the actuator in the cutter and actuator is a positionally incremented rotary motor interconnected with the transporter mechanism and operable to rotate the cylinder of the cutter.

25. Apparatus according to claim 24 in which the actuator rotates the cutter in positioned synchronism with the composite label while the elongate blade is effecting the cut of the composite label and which is further operable to rotate the cylinder, after a cut has been effected, at an accelerated slew rate to its predetermined home position preparatory to the next cut.

26. A machine that includes the cutter apparatus of claim 1 and that further includes a printer positioned to apply indicia onto each label.

27. A machine according to claim 26 in which the labels vary in label length and wherein the cutter apparatus is structured to achieve the precise cut at the forward and rearward edges of each said label despite variations in length between adjacent labels, printing being effected during cutting.

28. Printer, cutter, laminator apparatus to print onto a label and to cut accurately a composite that includes labels of different label lengths on a backing and laminate on the imprinted labels without cutting the backing of the composite, that comprises:

a transporter mechanism positioned to receive said composite and precisely operable to move the composite translationally in a direction at a selectively variable velocity;

detection means suitable to ascertain the precise location of individual labels on the composite and interconnected to provide signals to the transporter mechanism to enable the transporter mechanism to move the composite precisely along said direction; and a printer positioned to apply indicia onto each said label as the label moves in said direction;

a cutter and actuator assembly, said cutter and actuator assembly including an elongated blade skewed a predetermined amount to describe a generally axially-oriented helical blade being interconnected with and responsive to the transporter mechanism velocity and also responsive to the position of said label to effect a precise cut of the composite in synchronism with said composite, that is, the cutter during cutting moves the same incremental distances that the composite at the label forward and rearward edges are moving, and further being operable to discontinue cutting once the cut is effected and thereafter reposition said cutter independently of the label position and velocity until the next label forward edge has been brought into place by the transporter mechanism.

29. For use in a continuous labelling system that includes a printer, cutter apparatus to cut accurately a composite that includes a backing that carries labels that are imprinted by the printer, without cutting the backing of the composite, that comprises:

a transporter mechanism positioned to receive said composite and precisely operable to move the composite translationally in a direction at a selectively variable velocity established by said printer;

detection means suitable to ascertain the precise location of individual labels on the composite and interconnected to provide signals to the transporter mechanism to enable the transporter mechanism to move the composite precisely along said direction; and a cutter and actuator assembly, said cutter and actuator assembly including an elongated blade skewed a predetermined amount to describe a generally axially-oriented helical blade that is interconnected with and responsive to the printer selectively variable velocity and also responsive to the position of said label to effect a precise cut of a label along the label forward and rearward edges while the transporter mechanism is moving the composite, and further being operable to discontinue cutting once the cut is effected and thereafter reposition said cutter independently of the label position and velocity until the next label forward edge has been brought into place by the transporter mechanism, the cutter and actuator assembly being operable, in combination with said transporter mechanism, to provide said precise cut in synchronism with the composite, that is, the cutter moves the same incremental distance as the composite during cutting, printing onto each label being effected concurrently with said cutting.

30. Cutter apparatus to accurately cut a composite label, comprising:

a transporter mechanism for moving said composite label translationally in a direction at selected velocities in response to a transporter control signal;

a cutter and actuator assembly, said cutter and actuator assembly including an elongated blade skewed a predetermined amount to describe a generally axially-oriented helical blade that selectively rotates and engages said label at a cutpoint and in position registration with the cutpoint in response to a cutter control signal; and a controller providing said transporter control signal and said cutter control signal to cause said transporter mechanism to move said label and to cause said cutter and actuator assembly to move positionally synchronously with said label and continuously cut said label at said cutpoint while moving synchronously therewith in response to the velocity and size of said label, and to move independently of said label when said cutter is disengaged from said label.

31. The cutter apparatus of claim 30, wherein said controller includes means for determining one of the beginning and the end of said label, wherein said cutter and actuator assembly cuts said label at one of the beginning and the end of said label.

32. The cutter apparatus of claim 30, further including detection means for providing a detected position signal to said controller indicating the precise position of said label, said controller being operable in response thereto to provide a precisely controlled motion of said label.

33. The cutter apparatus of claim 30, wherein said controller further includes means for receiving an external motion control signal, wherein the motion of said transporter is responsive to said external motion control signal.

34. The cutter apparatus of claim 33, wherein said external motion control signal comprises a printer control signal for synchronizing the motion of said label with a label printer operable in a printing cycle, and said cutter and actuator assembly is operable to effect said cut of said label during said printing cycle.

35. A printer, cutter and laminator system that includes cutter apparatus as in claim 30 and that further includes a printer apparatus for applying indicia onto each label disposed on a backing and that further includes a laminating station interposed between the printer and the cutter and actuator assembly, said cutter and actuator assembly being operable to cut the label and the laminate without cutting the backing of the composite and as the backing, label and laminate, as a composite, move through the system.

36. A printer, cutter laminator system according to claim 35 in which the cutpoint of the cutter progresses across the width of the composite label while at the same time advancing a distance equal to the distance that the composite label advances to maintain a cutline parallel to the forward edge of the composite label.

37. A method of accurately cutting a composite that includes labels of a wide range of label lengths on a backing, without cutting the backing of the composite, that comprises:

receiving the composite and transporting the same precisely to move the composite translationally in a direction;

continuously determining position of the composite to ascertain the precise location of individual labels on the composite;

continuously cutting said transported labels with a helical cutter at selected positions in response to the position and translational motion of said composite;

discontinuing cutting once the cut is effected; and moving said helical cutter independently of said labels after discontinuing said cut while the composite is continuing to move in said direction, until the next label forward edge has been brought into place, wherein said precise cut is made and maintained in synchronism with the motion of said composite regardless of the speed of the composite and despite the wide range of label lengths and during imprinting of each said label.

* * * * *